INVENTOR.
Raymond H. Vermillion,
BY
ATTORNEY.

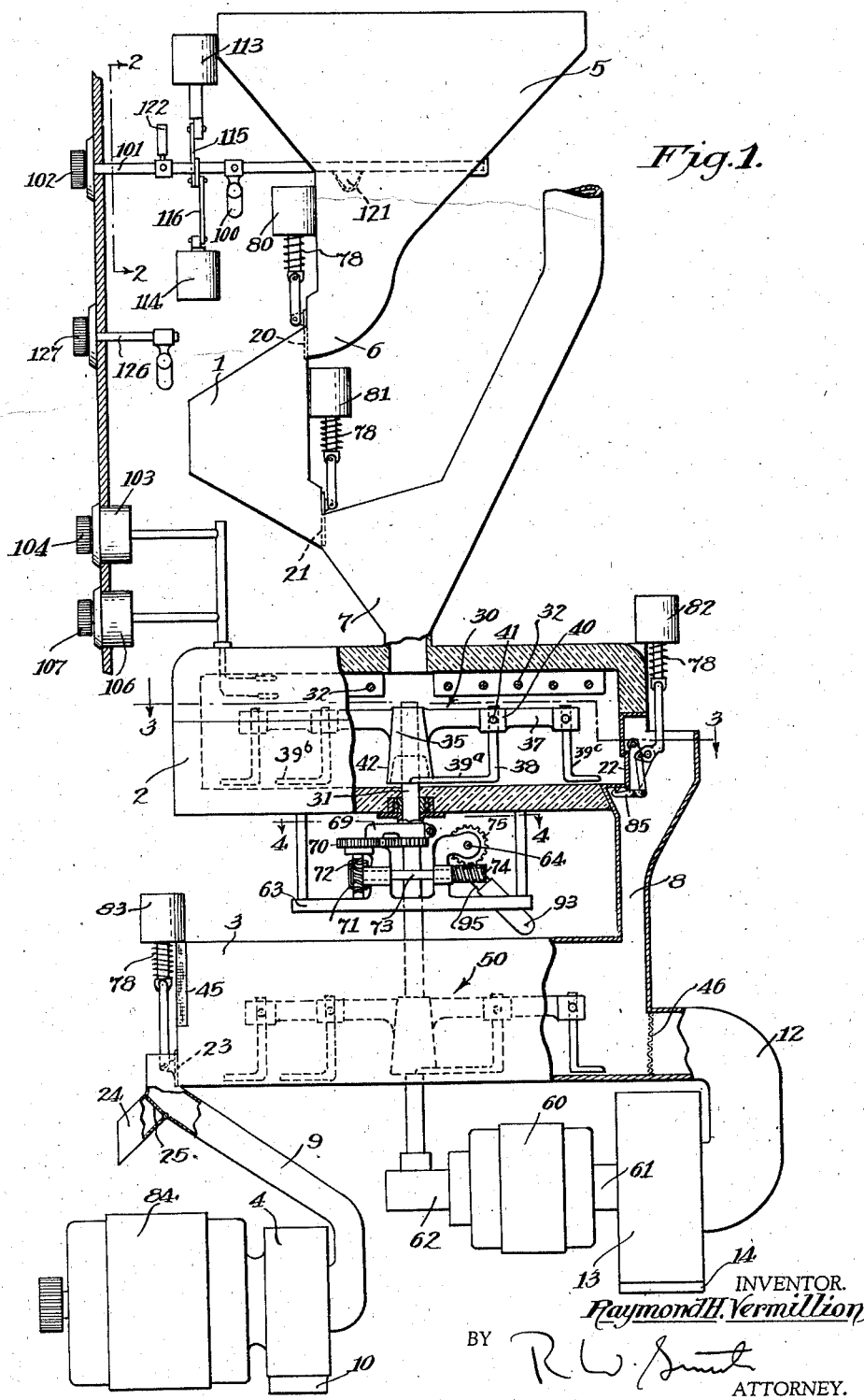

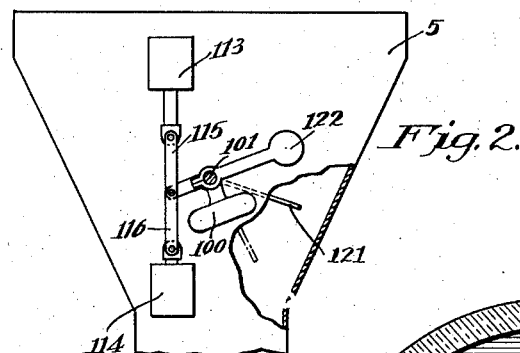
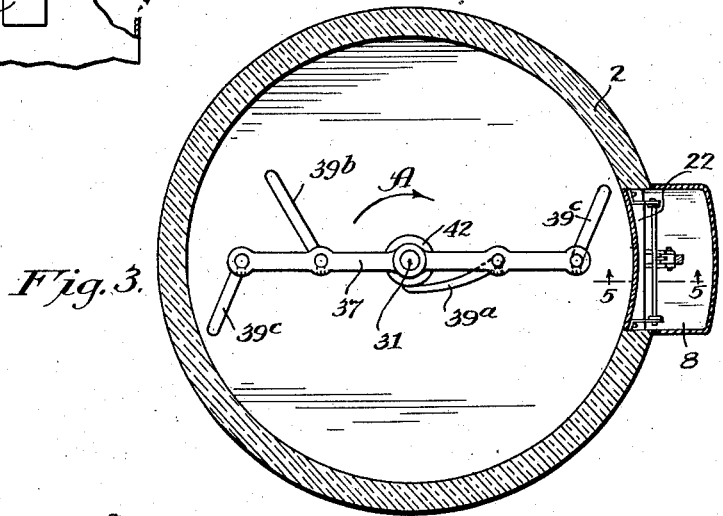
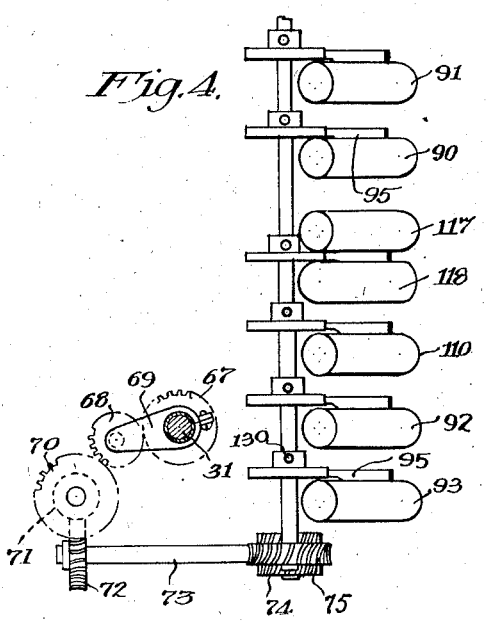
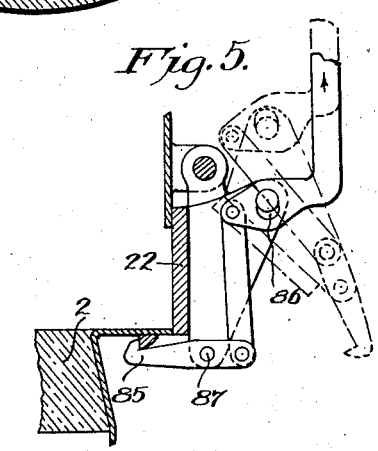

Patented Sept. 15, 1942

2,295,920

UNITED STATES PATENT OFFICE 2,295,920

PROCESSING MATERIAL SUCH AS GREEN COFFEE

Raymond H. Vermillion, Los Angeles, Calif., assignor, by mesne assignments, to Brinck Engineering Company, Inc., Los Angeles, Calif., a corporation of California Application September 23, 1938, Serial No. 231,387

12 Claims. (Cl. 34—45)

This invention relates to the processing of material such as coffee, by mechanism adapted for automatic cyclic operation for supplying a measured quantity of material to a processing chamber, heating the material, e. g. roasting the same, for predetermined time interval at predetermined temperature, and discharging the roasted product.

It is an object of the invention to provide automatic control, whereby when the cycle of operation has once been started it is automatically continued to completion independently of the operator, thereby insuring full roasting, and discharge of the roasted product after its processing has once been started.

It is a further object of the invention to provide automatic control for continuing the processing of successive batches of material until discontinued either at the will of the operator or by the available supply of material becoming exhausted.

It is a still further object of the invention to provide automatic control whereby upon discontinuation of the successive cycles of operation, either at the will of the operator or upon exhaustion of the available supply of green coffee, the current cycle of operation is automatically continued until its batch of material has been completely roasted and discharged.

It is a still further object of the invention to provide automatic control whereby the current cycle of operation is continued to completion, irrespective of the stage at which (at the will of the operator or by exhaustion of the available supply of green coffee) the successive cycles of operation happen to have been discontinued.

Further objects of the invention will be readily understood from the following description of the accompanying drawings, in which:

Fig. 1 is a side elevation of preferred apparatus.

Fig. 2 is a vertical section on the line 2—2 of Fig. 1.

Fig. 3 is a transverse section on the line 3—3 of Fig. 1.

Fig. 4 is a detail transverse section on the line 4—4 of Fig. 1.

Fig. 5 is a detail vertical section on the line 5—5 of Fig. 3.

Figure 6:
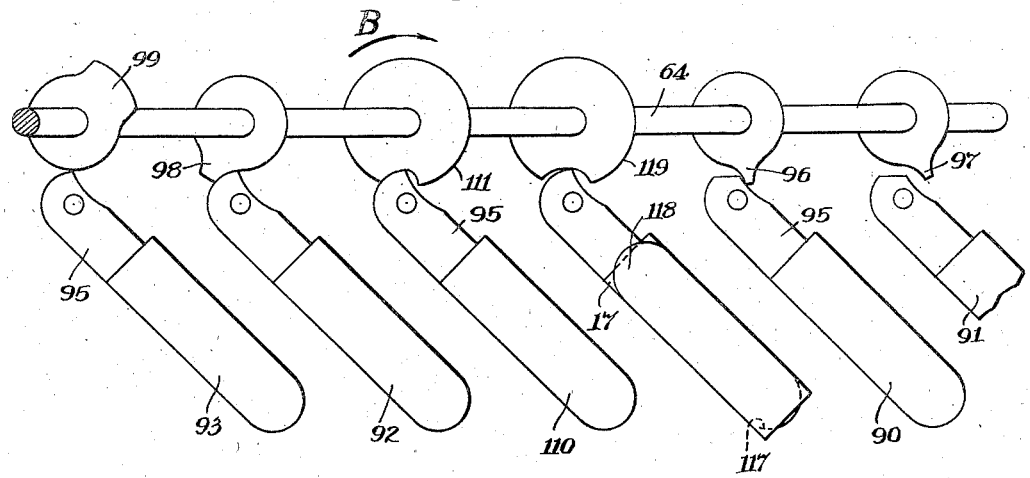
Fig. 6 is a diagrammatic view of the control mechanism.

The product which is to be roasted and ground, e. g. green coffee, is supplied to a measuring hopper 1, thence to a roasting oven 2, thence to a cooling chamber 3, and thence to a grinder 4. These elements are preferably arranged one below another as a part of a unitary assembly, with suitable communication between the successive elements for gravity flow of the material being processed.

As an instance of this arrangement, a supply hopper 5 communicates via a spout 6 with a measuring hopper 1, which in turn communicates via a funnel 7 with the roasting oven 2, and a spout 8 leads from the roasting oven to the cooling chamber 3. From the cooling chamber the roasted coffee is discharged via a spout 9 to the grinder 4, from which the ground coffee is discharged at 10. Chaff from the roasted coffee may be withdrawn from the cooling chamber 3 via a spout 12, in which a fan 13 is mounted, with the chaff discharging from the outlet 14 of the fan, into a suitable sack (not shown).

A door 20 cooperates with the spout 6 for controlling passage of green coffee to the measuring hopper 1, and in similar manner a door 21 cooperates with the funnel 7 for controlling passage of green coffee to the roasting oven 2. A door 22 controls discharge of roasted coffee from the roasting oven to the spout 8, and a door 23 controls discharge of roasted coffee from the cooling chamber 3 to the spout 9. A chute 24 may communicate with the spout 9, and a door 25 may normally close this chute but may be manually swung to dotted line position as shown at Fig. 1, in order to close the spout 9 and open the chute 24 for discharging the roasted coffee via the chute, without passing through the grinder 4.

In the roasting oven 2, the green coffee which is supplied via the funnel 7 is spread out on the base of the oven and is turned over and over, and while the door 22 remains closed it is moved around the oven and radially back and forth therein. During this movement of the coffee it is roasted, preferably by heat generated by electrical heating elements 32 which are mounted on the underside of the top of the oven. When the coffee has been roasted and the door 22 is opened, the roasted coffee is moved around the oven for centrifugal discharge via the open door.

For thus moving the coffee in the oven, an agitator 30 is employed. The agitator preferably comprises a hub 35 fixed on a shaft 31 and having a diametrical arm 37 fixed to the upper end of the hub below the heating elements 32. Shanks 38 depend from the arm 37 and terminate in lateral fingers which just clear the base of the oven 2, and the shanks 38 are rotatably adjustable in bearings 40 of the arm 37 and may be locked in adjusted position by set screws 41, so that the fingers may be positioned in any desired angular relation to radii of rotation of the agitator.

The hub 35 preferably forms a tapering baffle 42 for directing the coffee away from the axis of rotation; and the fingers are adjusted so that while the door 22 is closed and during rotation of the arm 37 as indicated by arrow A (Fig. 3), the fingers move through the coffee, spreading it out and tumbling it on the base of the oven, and at the same time moving it around the oven and radially back and forth therein. For this purpose, one finger, designated 39ª, engages the coffee adjacent the baffle 42; and another finger, designated 39ᵇ, moves the coffee around the oven and also tends to move it centripetally in the oven. The radially outer fingers, designated 39ᶜ, move the coffee around the oven, and as it collects at the outer periphery of the oven it flows back into the path of the finger 39ᵇ, so that it is again spread out over the entire area of the oven. When the door 22 is opened, the fingers move the coffee around the oven and eventually centrifugally discharge all of the roasted coffee through the open door and into the spout 8.

In the cooling chamber 3 the roasted coffee which is supplied via the spout 8 is similarly spread out and turned over and over, and moved around the cooling chamber and back and forth therein as long as the door 23 remains closed, and is then centrifugally discharged via said door when it is opened. During this movement of the roasted coffee, the fan 13 draws air into the cooling chamber via a screen 45 at the periphery of the cooling chamber diametrically opposite the spout 12, and thence across the cooling chamber and outwardly via the spout 12, the entrance to which is preferably screened as shown at 46. The roasted coffee is thus cooled prior to its discharge via the door 23, while chaff is drawn into the spout 12 from whence it is discharged at the outlet 14.

For moving the roasted coffee in the cooling chamber, an agitator 50 is employed, similar in all respects to the agitator 30 and therefore not described in detail. The hub of this agitator is fixed on the shaft 31 which depends from the roasting oven 2 and thence through the cooling chamber 3.

The shaft 31 may be driven by an electric motor 60 which may also drive the fan 13; the motor being preferably mounted below the cooling chamber 3, with one end of its shaft adapted for axially-alined direct connection with the shaft of the fan 13 as shown at 61, and with the other end of its shaft forming a worm drive for the shaft 31, with said worm drive housed within a casing 62.

Control mechanism is driven by the shaft 31, and is preferably mounted on a support 63 which is positioned between the roasting oven 2 and the cooling chamber 3. This control mechanism comprises a shaft 64 carrying a plurality of cams and driven from the shaft 31 through suitable reduction gearing, so that the shaft 64 makes a complete revolution in a time interval within a range of from approximately ten to twenty minutes. Gears are preferably interchangeable to provide a gear ratio for making a complete revolution of the shaft in any desired time interval within said range.

As an instance of this arrangement, a gear 67 may be fixed for rotation with the shaft 31, and may mesh with a gear 68 which is carried by a bracket 69 which is arcuately adjustable concentric with the shaft 31. The gear 68 meshes with a gear 70 which is journaled on the support 63 and which has a worm 71 fixed for rotation therewith. The worm 71 meshes with a worm gear 72 which is fixed on a shaft 73, this shaft being journaled on the support 63. A worm 74 is fixed on the opposite end of the shaft 73 and meshes with a worm gear 75 on the cam shaft 64. Gears 70 of different size may be interchangeably employed to provide different gear ratios for the shaft 64, the gear 68 being arcuately adjusted by its bracket 69 so as to mesh with any particular gear 70.

During one complete revolution of the shaft 64, its cams successively control opening of the door 20 for supplying material from the hopper 5 to the measuring hopper 1, closing said door to trap a measured supply of material in the hopper 1, opening the door 21 for discharging said measured supply into the roasting oven 2, opening the door 22 after a predetermined time interval for discharging the roasted material into the cooling chamber 3, opening the door 23 after a predetermined time interval for discharging the cooled material via the spout 9, and operating the grinder 4 for grinding said material.

For this purpose, electrical controls are preferably employed, with the cams on the shaft 64 adapted to open and close electrical switches. As an instance of this arrangement, the doors 20, 21, 22 and 23 are respectively actuated by solenoids 80, 81, 82 and 83, and the grinder 4 is driven by an electric motor 84. The doors 20, 21 and 23 are preferably sliding doors which are positively opened when their respective solenoids are energized, and which are preferably closed by springs 78 when their respective solenoids are deenergized. The door 22 is preferably a hinged door, permitting opening and closing without pressure which may be generated in the oven 2 tending to bind the door; and this hinged door preferably has an automatic lock 85 (shown in detail at Fig. 5), whereby when the solenoid 82 is energized the lost-motion connection 86 first releases the lock 85 by pivotal movement at 87, and when the lost motion has been taken up the door 22 is swung open. When the solenoid 82 is deenergized the door 22 swings to closed position, preferably by a spring 78, and the lock 85 then automatically engages for securing the door in closed position.

Electrical circuits for the solenoids 80, 81 and 82 are respectively controlled by switches 90, 91 and 92; and electric circuits for both the solenoid 83 and the electric motor 84 are controlled by a switch 93. The switches 90, 91, 92 and 93 are preferably mercury switches, respectively mounted on rocker arms 95 which respectively cooperate with cams on the shaft 64. When each arm 95 is engaged by a low surface of its cooperating cam its mercury switch is open, and when engaged by a projecting surface of its cooperating cam its mercury switch is closed. The cam surfaces for closing the respective switches 90, 91, 92 and 93 are shown at 96, 97, 98 and 99.

The electrical heating elements 32 for the roasting oven are preferably controlled by a switch 100, which is preferably a mercury switch actuated by a shaft 101 which has a manual control 102; and a thermostatic control 103 is preferably provided in the circuit for the heating elements, with this control manually adjustable as shown at 104. By manually adjusting the thermostatic control 103, it thus automatically maintains the roasting oven at predetermined temperature while the main switch 100 remains closed.

The electric motor 60 is preferably controlled by a thermostatic switch 106, which is actuated responsive to temperature in the roasting oven 2 and which is manually adjustable as shown at 107. By manually adjusting the thermostatic switch, it thus automatically closes and starts the motor 60 as soon and for as long as there is predetermined temperature in the roasting oven 2.

Means are provided whereby after the thermostatic switch 106 has closed for starting the motor 60 and thus rotating the cam shaft 64, the motor circuit is maintained for insuring complete rotation of the cam shaft, irrespective of prior opening of the switch 106. For this purpose a shunt circuit extends around the thermostatic switch 106 and has a sustaining switch 110, preferably a mercury switch, which is controlled by a cam on the shaft 64. The switch 110 is mounted on a rocker arm 95 such as previously described and which cooperates with a cam of the shaft 64, so that when the rocker arm is engaged by a low surface of its cooperating cam the switch 110 is open, and when engaged by a projecting cam surface 111 of its cooperating cam the switch 110 is closed.

Means are also provided whereby when the main switch 100 has once been closed to start the cycle of operation and green coffee has been supplied to the measuring hopper 1, the main switch is then positively held in closed position throughout succeeding steps of the process until the roasted coffee has been discharged from the oven 2. During the remainder of the cycle of operation and during the first part of the next succeeding cycle, the main switch 100 is not positively held, but remains in closed position as hereinafter described, thereby continuing the successive cycles of operation, unless during the time when the main switch is not positively held in its closed position it is actuated as hereinafter described, so as to open the same. If the main switch is thus opened at the end of a cycle of operation, the next cycle is inaugurated (but without a new supply of green coffee being discharged into the oven 2) and this next cycle is continued to completion, but a next succeeding cycle of operation is not inaugurated. Means are provided for actuating the main switch to open the same during the time when said switch is not positively held in closed position; and this actuating means is preferably operated responsive to the supply of green coffee in the hopper 5 becoming depleted, or may preferably also be operated at the will of the operator.

As an instance of this arrangement, solenoids 113 and 114 are linked to the shaft 101 at 115 and 116, so that when respectively energized they rock the shaft 101 so as to respectively close and open the main switch 100. The solenoids 113—114 are controlled respectively by control switches 117—118, which are preferably mercury switches mounted on a common rocker arm 95 such as previously described, with the switches mounted on the rocker arm in reversed position relative to one another, so that when the arm is rocked to close one of said switches the other is opened, and vice versa. The rocker arm for the switches 117—118 is controlled by a cam on the shaft 64 such as previously described, and which is arranged so that when the rocker arm is engaged by a low surface of the cam the switch 117 is open and the switch 118 is closed, and when the rocker arm is engaged by a projecting cam surface 119 the switch 117 is closed and the switch 118 is open.

When there is a sufficient amount of green coffee in the hopper 5 to supply that quantity of material to the measuring hopper 1 which will constitute the predetermined charge, the weight of the coffee in the hopper 5 holds the shaft 101 in position closing the main switch 100, provided the solenoid 114 is not energized (as would open the main switch irrespective of the weight of the coffee); but when the amount of coffee in the hopper 5 is less than that which will supply a full charge of the measuring hopper 1, the shaft 101 is rocked so as to open the main switch 100, provided the solenoid 113 is not energized (as would hold the main switch in closed position irrespective of the rocking tendency of the shaft overbalancing the weight of the depleted quantity of coffee in the hopper 5).

For this purpose, a blade 121 is fixed on the shaft 101 within the hopper 5 and a counterbalance 122 is preferably fixed on the shaft exteriorly of the hopper. The weight of linkage 115—116 is such that when there is a depleted supply of green coffee in the hopper 5, the weight of the linkage overbalances the weight of the coffee and rocks the shaft 101 to position opening the main switch 100 as shown at Fig. 2; but when there is an adequate supply of green coffee in the hopper 5, and the shaft 101 has once been rocked to close the main switch 100, the weight of the coffee against the blade 121 overbalances the weight of the linkage 115—116 and thus holds the blade swung to the position shown by dot and dash lines at Fig. 2, thereby holding the shaft 101 rocked to its position closing the main switch 100.

Irrespective of the shaft 101 being rocked to open the main switch 100 when the supply of green coffee in the hopper 5 is depleted, it may be rocked to open the main switch at the will of the operator, but only at such time as the solenoid 113 is deenergized for permitting such rocking movement of the shaft. For this purpose, a switch 125 which is preferably a mercury switch, is provided in the electrical circuit which includes the switch 118 and the solenoid 114, and is mounted on a shaft 126 having a manual control 127. The switch 125 is normally open, but is closed by the operator whenever it is desired to discontinue the successive cycles of operation, without waiting for depletion of the supply of green coffee contained in the hopper 5. If the switch 125 is closed during that portion of a cycle of rotation of shaft 64 when the switches 117—118 are respectively closed and open, the open switch 118 prevents the closing of the switch 125 having any immediate effect for energizing the solenoid 114, and the main switch 100 thus remains closed and the cycle of rotation continues to completion, at which time the switches 117—118 are respectively opened and closed, so that the closed switch 125 then energizes the solenoid 114 for opening the main switch 100.

The control cams on the shaft 64 are preferably detachably mounted and may be set in circumferentially adjusted position by set screws 130, whereby cams having different length of cam surfaces may be interchangeably employed and the relative circumferential position of the respective cam surfaces may be adjusted. The switches controlled by the respective cams may thus be closed during any desired portion of the time consumed by one complete rotation of the cam shaft 64, and the time intervals during which the respective switches are closed may be adjusted relative to one another. In general, the relative arrangement of the cams is as shown at Fig. 6.

As shown by this diagram, when the apparatus is not in operation the shaft 64 is stationary with the control cams in position whereby all of the rocker arms 95 are engaged by low surfaces of their respective cams, so that the switches 90, 91, 92, 93, 110 and 117 are in open position and the switch 118 is closed.

During rotation of the shaft 64 as indicated by the arrow B, the cam surface 96 first engages its cooperating arm 95 for rocking the arm to close the switch 90. Immediately thereafter the cam surface 111 engages its cooperating arm 95 for rocking the arm to close the switch 110 and maintain it closed until the end of a complete rotation of the cam shaft 64, whereupon the cam surface 111 clears its arm 95 to permit reverse gravity responsive rocking of the arm for opening the switch 110. After the switch 110 has been closed and the switch 90 has remained closed for a predetermined relatively short interval, the cam surface 96 clears its arm 95 so that the arm is reversely rocked by gravity for again opening the switch 90 which then remains open throughout the remainder of a complete rotation of the cam shaft 64. The cam surface 119 then engages its rocker arm 95 for rocking the arm to close the switch 117 and open the switch 118, and then maintain these switches in this position until just prior to the end of a complete rotation of the cam shaft 64, whereupon the cam surface 119 clears its arm 95 so that the arm is reversely rocked by gravity for again opening the switch 117 and closing the switch 118.

Immediately after the switch 117 has been closed and the switch 118 has been opened, the cam surface 97 engages its arm 95 for rocking the arm to close the switch 91; and after the switch 91 has remained closed for a predetermined relatively short interval, the cam surface 97 clears its arm 95 so that the arm is reversely rocked by gravity for again opening the switch 91, which then remains open throughout the remainder of a complete rotation of the cam shaft.

After a further predetermined interval, the cam surface 99 engages its arm 95 for rocking the arm to close the switch 93; and after the switch 93 has remained closed for a predetermined appreciable time interval the cam surface 99 clears its arm 95 so that the arm is reversely rocked by gravity for again opening the switch 93, which then remains open throughout the remainder of a complete rotation of the cam shaft.

After a further appreciable time interval, the cam surface 98 engages its arm 95 for rocking the arm to close the switch 92. The cam surface 98 maintains engagement with its arm 95 for a predetermined time interval so as to maintain the switch 92 closed; and just before the cam surface 98 disengages its arm 95 and just before the end of a complete rotation of the cam shaft 64, the cam surface 119 moves clear of its arm 95 so that the switch 117 is opened and the switch 118 is closed as previously described.

Shortly thereafter, just at the end of a complete rotation of the cam shaft 64, the cam surface 98 moves clear of its cooperating arm 95 so that the arm is reversely rocked by gravity to open the switch 92. A complete cycle of rotation is thus completed, with the cam surface 96 ready to initially engage its cooperating arm 95 at the start of a next succeeding cycle of rotation.

Figure 7:
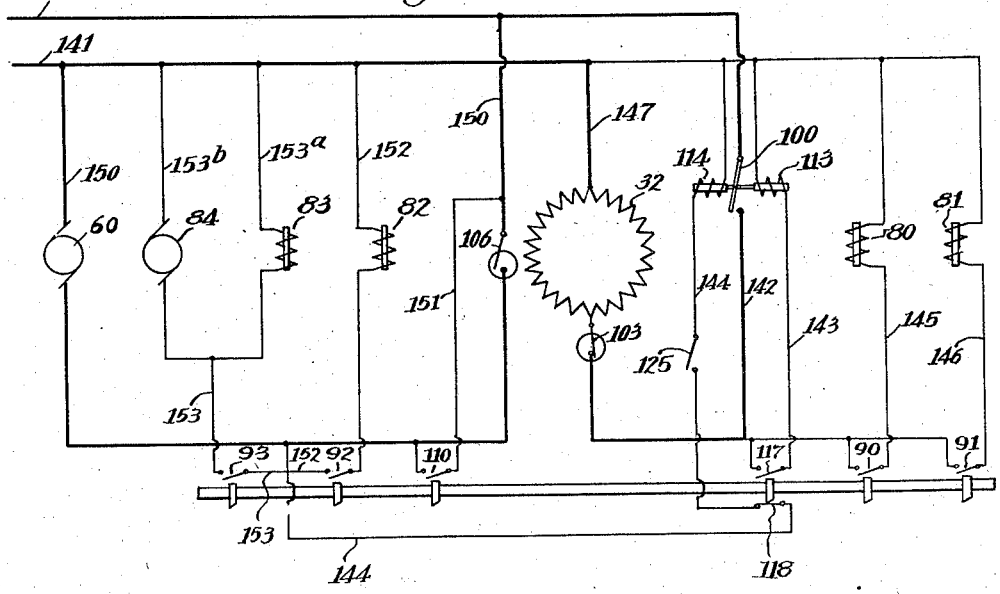
Fig. 7 is a wiring diagram.

A wiring diagram for the electrical circuits is shown at Fig. 7.

Leads 140—141 are connected to a source of electrical energy. A main circuit 142 is connected to the lead 140 and includes the main switch 100; and this main circuit branches to form the parallel circuits 143—145—146—147 which are connected to the lead 141. The control circuit 147 controls the heating elements 32 via the thermostat 103; the solenoid circuit 143 includes the switch 117 and the solenoid 113; the control circuit 145 includes the switch 90 and the solenoid 80; and the control circuit 146 includes the switch 91 and the solenoid 81.

A power main circuit 150 is connected to the leads 140—141 and includes the thermostatic switch 106 and the electric motor 60 which drives the cam shaft 64. A shunt circuit 151 is connected to the main circuit 150 and extends around the thermostatic switch 106, with the sustaining switch 110 in this shunt circuit. Circuits 144, 152 and 153 are in parallel with the motor 60 in the power circuit 150, being connected at one end to the power circuit between the shunt circuit 151 and the motor 60, with the opposite ends of these circuits respectively connected to the lead 141. The solenoid circuit 144 includes the switch 118 and the solenoid 114; the control circuit 152 includes the switch 92 and the solenoid 82; and the control circuit 153 includes the switch 93 and branches to form parallel circuits 153$^a$ and 153$^b$, which respectively include the solenoid 83 and the motor 84. The auxiliary switch 125 is in the circuit 144.

By the arrangement as thus described, the control circuit 147 (which controls the heating means 32) is a master control circuit for the apparatus, and the thermostatic switch 106 is a master control switch for the apparatus.

When the apparatus is not in use, the controls are in the positions shown at Figs. 6 and 7, with the cam shaft 64 stationary due to the switches 106 and 110 being open, and with no heat supplied to the roasting oven 2 due to the switch 100 being open. To prepare for operation, the thermostatic control 103 is set to maintain the roasting oven at any desired temperature, and the thermostatic switch 106 is set to close and then remain closed as long as this predetermined temperature is maintained in the roasting oven. A gear 70 is employed which will provide a desired time interval for one complete rotation of the cam shaft 64, i. e. for supplying, properly roasting and then discharging each batch of material. A gear 70 is selected whereby this time interval is a predetermined time, within a range of approximately ten to twenty minutes when processing approximately three pounds of green coffee in each batch. The cams which are mounted on the shaft 64 are selected and relatively adjusted so as to divide this elapsed time into proper stages of supplying the green coffee to the measuring hopper, discharging a measured batch into the roasting oven, discharging the roasted coffee into the cooling chamber, and finally grinding the roasted coffee.

In operation, green coffee is supplied to the hopper 5, preferably in sufficient quantity to furnish several successive batches to be roasted; and the switch 100 is closed by manually rocking the shaft 101, thereby positioning the blade 121 so that the weight of the coffee in the hopper 5 tends to maintain the switch 100 in closed position. By thus closing the switch 100 the heating elements 32 are energized for heating the oven 2. When predetermined roasting temperature is attained (with said temperature then maintained by the thermostatic control 103), the thermostatic switch 106 closes, thereby energizing the motor 60 so as to drive the fan 13, actuate the agitators 30 and 50 and slowly rotate the cam shaft 64.

The solenoid 80 is then energized as a result of the cam surface 96 closing the switch 90, thereby opening the door 20 so that green coffee is supplied to the measuring hopper which is adapted to contain a predetermined quantity of coffee, e. g. three pounds. The cam surface 111 then closes the switch 110 and maintains it closed to the end of the cycle of rotation, so that when the processing of a batch of coffee has once been started by opening the door 20, the shunt circuit 151 which is completed by closing the switch 110 continues to energize the motor 60 and thus completes the cycle of rotation, whether or not the switch 106 remains closed. The solenoid 80 is then deenergized as a result of the cam surface 96 moving clear of its cooperating arm 95 and thus permitting the switch 90 to open; and the door 20 is thus closed by its spring 78, with a measured batch of green coffee trapped in the hopper 1.

The solenoid 113 is then energized as a result of the cam surface 119 closing and then maintaining the switch 117 in closed position until the end of the cycle of operation, thereby positively holding the shaft 101 in its rocked position and thus maintaining the main switch 100 in closed position until the end of the cycle of rotation. Consequently, when the heating elements have once been energized by closing the main switch 100 and the cycle of operation has once reached the point thus far described, the heating elements remain energized for maintaining roasting temperature in the oven 2 until the cycle of rotation is completed, by which time the coffee will have been roasted and discharged from the roasting oven.

After the door 20 has closed, with a measured batch of green coffee in the hopper 1, the solenoid 81 is energized as a result of the cam surface 97 closing the switch 91, thereby opening the door 21 so that the measured batch of green coffee is discharged into the roasting oven 2; and the solenoid 81 is then deenergized as a result of the cam surface 97 moving clear of its cooperating arm 95, so as to permit the switch 91 to open, whereupon the door 21 is reclosed by its spring 78.

The solenoid 83 and the grinder motor 84 are then energized as a result of the cam surface 99 closing the switch 93, thereby opening the door 23 and actuating the grinder 4; and after a time interval adequate for discharging a batch of the roasted coffee from the cooling chamber and grinding the same, the cam surface 99 moves clear of its cooperating arm 95 so as to permit the switch 93 to open, whereupon the door 23 is reclosed by its spring 78, and the grinder 4 stops. This step of opening the door 23 and starting the grinder 4 has no effect upon the batch of material, the progress of which has so far been traced, since this batch of material is still in the roasting oven 2; but when a plurality of cycles of operation successively follow one another, opening the door 23 and starting the grinder 4 during each cycle of rotation of the shaft 64, is effective for discharging and grinding the batch of material which has been roasted during the next preceding rotation of the shaft 64 and which at the end of said rotation of the shaft will have been left in the cooling chamber 3 as hereinafter described.

Returning to that rotation of the shaft 64 which is being described, the solenoid 82 is energized at an appreciable time interval after the solenoid 83 and the grinder motor 84 have been energized and subsequently deenergized. The solenoid 82 is energized as a result of the cam surface 98 closing the switch 92, thereby opening the door 22 for discharging roasted coffee from the oven 2 into the cooling chamber 3. The cam surface 98 is positioned relative to the cam surface 97, so that after green coffee has been supplied to the roasting oven responsive to the switch 91 having been closed by the cam surface 97, nearly a complete rotation of the shaft 64 follows before the cam surface 98 closes its switch 92 to discharge the roasted coffee from the oven. Consequently the roasting period covers a desired appreciable time interval, nearly equal to the total time consumed in one complete rotation of the shaft 64. The cam surface 98 maintains engagement with its cooperating arm 95 for an appreciable time interval, so that the door 22 remains open for a time interval sufficient to insure all of the roasted coffee being centrifugally discharged from the oven 2, responsive to rotation of the agitator 30.

While the cam surface 98 is still in engagement with its cooperating arm 95, the cam surface 119 moves clear of its arm 95 so that the latter rocks responsive to gravity for opening the switch 117 and closing the switch 118, thereby deenergizing the solenoid 113 so that the main switch 100 is no longer positively held in closed position. Immediately thereafter, the cam surface 98 moves clear of its cooperating arm 95, whereupon the arm rocks by gravity to open the switch 92, thereby deenergizing the solenoid 82 so that the door 22 is closed by its spring 79; and at approximately the same time or immediately thereafter, the cam surface 111 moves clear of its cooperating arm 95, whereupon this arm rocks by gravity to open the switch 110. This is the end of a complete rotation of the shaft 64, the control cams now being in their original position, with the batch of roasted coffee now contained in the cooling chamber 3.

At this end of a complete rotation of the shaft 64, the shaft 101 is no longer positively held in position closing the main switch 100 since the solenoid 113 is now deenergized; but if there is an adequate supply of green coffee in the hopper 5, the weight of the coffee against the blade 121 will prevent the shaft 101 rocking to position opening the main switch 100 (unless rocked at the will of the operator as hereinafter described). Rotation of the shaft 64 is thus continued without attention on the part of the operator, since although the shunt circuit 151 is now broken by its open switch 110, the closed switch 100 causes the elements 32 to remain energized for maintaining roasting temperature in the oven 2, and the thermostatic switch 106 is thus maintained closed for energizing the motor 60 to inaugurate the next succeeding rotation of the cam shaft 64.

This next following rotation of the cam shaft is then continued to completion as previously described, i. e. by the initial rotation of the cam shaft closing the switches 110 and 117; and during this next succeeding rotation of the cam shaft, opening the door 23 and starting the grinder motor 84 permits the agitator 50 to centrifugally discharge the coffee which has been roasted during the preceding rotation of the cam shaft and which is contained in the cooling chamber 3, with this batch of roasted coffee supplied to the grinder 4 in which it is then ground. The cam surface 99 which controls this operation is of a length to maintain the door 23 open for a sufficient time interval to permit all of the roasted coffee being discharged from the cooling chamber 3 and to actuate the grinder 4 until the entire batch of coffee has been ground. The cam surface 99 is circumferentially positioned with relation to the cam surface 98, so that after the cam surface 98 has caused the door 22 to open at the end of a rotation of the cam shaft 64 and thus discharge the roasted coffee into the cooling chamber 3, there is an appreciable time interval during the next succeeding rotation of the cam shaft, before the door 23 opens as a result of the cam surface 99 engaging its cooperating arm 95, with said time interval sufficient to insure the roasted coffee being properly cooled in the chamber 3 and chaff being withdrawn therefrom via the spout 12.

By the arrangement as thus described, cycles of operation will continuously follow one another as long as there is ample supply of green coffee in the hopper 5. But as the supply approaches exhaustion a point will finally be reached during successive rotations of the shaft 64 and while the solenoid 80 is energized for supplying green coffee to the hopper 1 via the open door 20, when the weight of the residual supply of green coffee in the hopper 5 is no longer sufficient to hold the blade 121 depressed against the weight of the linkage 115—116; and since during this time when the solenoid 80 is energized the switch 117 is open and its solenoid 113 is thus deenergized, the switch 100 is not being positively held in closed position by the solenoid 113 but will swing to open position responsive to the weight of the linkage 115—116. The open switch 100 will thus cut off current to the heating elements 32 and will open the control circuits 143, 145 and 146. However, the switch 119 will have closed when this occurs; or will be just about to close, with the thermostatic switch 106 remaining closed (responsive to the heat previously generated in the oven 2) for the short time required to continue rotation of the shaft 64 until the switch 110 does close.

The closed switch 110 then continues rotation of the shaft 64, but during this continued rotation the closing of the switches 117 and 91 performs no function since their circuits are broken at the switch 100. Therefore the solenoid 113 is not energized to again close the switch 100, nor is the solenoid 81 energized to open the door 21 for discharging green coffee into the oven 2. However, continued rotation of the shaft 64 energizes the solenoid 83 and the grinder motor 84 when the cam surface 99 engages its cooperating arm 95, thereby discharging and grinding the batch of coffee which is then in the cooling chamber 3 as a result of the preceding rotation of the shaft 64. The apparatus is thus cleared of coffee, and at the end of rotation of shaft 64 the switch 110 is opened as a result of cam surface 111 moving clear of its cooperating arm 95. The circuit for the motor 60 is thus broken, since the shunt circuit 151 is broken at the open switch 110 and the main circuit 150 is broken at the thermostatic switch 106 (which is now open as a result of the roasting oven 2 having cooled off).

The shaft 64 thus remains stationary in the position shown at Fig. 6, and the entire apparatus thus becomes inoperative.

If it is desired to shut down the apparatus while there is still an ample supply of coffee in the hopper 5, the shaft 126 is manually rocked so as to close the switch 125. If this is done at any time during rotation of the shaft 64, except at the short time interval during which the cam surface 119 is clear of its arm 95, the switch 118 will be in open position and will thus break the control circuit 144 even though the switch 125 has been closed. Therefore, the solenoid 114 will not be energized to rock the shaft 101 so as to open the switch 100, but on the other hand the switch 117 being closed, the solenoid 113 will be energized to maintain the shaft 101 in position closing the switch 100.

Rotation of the shaft 64 will thus continue to the end of its rotation, whereupon the cam surface 119 clears its arm 95 so that the switch 118 is closed and the switch 117 is opened. The solenoid 113 is thus deenergized, thereby releasing the shaft 101 so that it may be rocked to open the switch 100; and the solenoid 114 is energized via the closed switches 118 and 125, thereby rocking the shaft 101, against the weight of the coffee in the hopper 5, so as to open the switch 100. The shaft 101 having thus been rocked to open the switch 100, the blade 121 is in such inclined position, as shown by full lines at Fig. 2, that when the solenoid 114 is subsequently deenergized, the coffee in the hopper 5 will not again depress the blade to reclose the switch 100, it being necessary to again manually turn the shaft 101 in order to reclose this switch.

When the solenoid 114 has been energized to open the switch 100, this open switch cuts off current to the heating elements 32 and opens the control circuits 143, 145 and 146. However, when this occurs the thermostatic switch 106 will remain closed (responsive to the heat previously generated in the oven 2) for the short time required to continue rotation of the shaft 64 until the switch 110 closes.

The closed switch 110 then continues rotation of the shaft 64, but as the switches 90, 117 and 91 successively close they perform no function since their circuits are broken at the open switch 100. Therefore the solenoids 80 and 81 are not energized to start another batch of material through a cycle of operation. However, continued rotation of the shaft 64 energizes the solenoid 83 and the grinder motor 84 when the cam surface 99 engages its cooperating arm 95, thereby discharging and grinding the batch of roasted coffee which is then in the cooling chamber 3 as a result of the preceding rotation of the shaft 64. The apparatus is thus cleared of coffee, and at the end of rotation of the shaft 64 the switch 110 is opened as a result of cam surface 111 moving clear of its cooperating arm 95. The circuit for the motor 60 is thus broken, since the open switch 110 breaks the shunt circuit 151 and the main circuit 150 is also open (due to the switch 106 having opened as a result of the roasting oven cooling off). The cam shaft 64 thus remains stationary, in the position shown at Fig. 6, and the entire apparatus thus becomes inoperative.

I claim:

1. In combination, a processing chamber, means for heating the processing chamber, means for energizing and deenergizing the heating means including a main control shiftable to a first or energizing position and a second or deenergizing position, a timer, driving means for rotating the timer, a thermostat operative responsive to predetermined temperature in the processing chamber for causing operation of the driving means, sustaining means, means actuated by the rotatable timer for operating the sustaining means so that it causes continuation of the operation of the driving means which has been inaugurated by operation of the thermostat, except at the end of the cycle of rotation of the timer and independently of operation of the thermostat, means actuated by the rotatable timer for locking the main control in its first position except at the end of the cycle of rotation of the timer, and means controlled by the rotatable timer for respectively supplying material to and discharging material from the processing chamber, at start and end respectively of the cycle of rotation of the timer.

2. In combination, a supply hopper, a processing chamber, means for processing material in the chamber, a timer, driving means for rotating the timer, means for energizing and deenergizing the driving means including a main control shiftable to a first or energizing position and a second or deenergizing position, biasing means tending to shift the control to its second position, means operable by material in the hopper in excess of predetermined minimum, tending to maintain the main control shifted to its first position against the action of said biasing means, means actuated by the rotatable timer for locking the main control in its first position except at the end of the cycle of rotation of the timer, and means controlled by the rotatable timer for respectively supplying material from the hopper to the processing chamber and discharging material from the processing chamber, at start and end respectively of the cycle of rotation of the timer.

3. In combination, a supply hopper, a processing chamber, means for heating the processing chamber, means for energizing and deenergizing the heating means including a main control shiftable to a first or energizing position and a second or deenergizing position, biasing means tending to shift the control to its second position, means operable by material in the hopper in excess of predetermined minimum, tending to maintain the main control shifted to its first position against the action of said biasing means, a timer, driving means for rotating the timer, a thermostat operative responsive to predetermined temperature in the processing chamber for causing operation of the driving means, sustaining means, means actuated by the rotatable timer for operating the sustaining means so that it causes continuation of the operation of the driving means which has been inaugurated by operation of the thermostat, except at the end of the cycle of rotation of the timer and independently of operation of the thermostat, means actuated by the rotatable timer but only if the main control is in its first position, for locking the main control in said first position except at the end of the cycle of rotation of the timer, and means controlled by the rotatable timer for respectively supplying material from the hopper to the processing chamber and discharging material from the processing chamber, at start and end respectively of the cycle of rotation of the timer.

4. In combination, a processing chamber, means for processing material in the chamber, a timer, driving means for rotating the timer, means for energizing and deenergizing the driving means including a main control shiftable to a first or energizing position and a second or deenergizing position, shutoff means, means for shifting the shutoff means to operative or inoperative position, means actuated by the rotatable timer at the end of its cycle of rotation but only if the shutoff means has been shifted to operative position, for shifting the main control to its second position, and means controlled by the rotatable timer for respectively supplying material to and discharging material from the processing chamber, at start and end respectively of the cycle of rotation of the timer.

5. In combination, a processing chamber, means for processing material in the chamber, a timer, driving means for rotating the timer, means for energizing and deenergizing the driving means including a main control shiftable to a first or energizing position and a second or deenergizing position, means actuated by the rotatable timer for locking the main control in its first position except at the end of the cycle of rotation of the timer, shutoff means, means for shifting the shutoff means to operative or inoperative position, means actuated by the rotatable timer at the end of its cycle of rotation but only if the shutoff means has been shifted to operative position, for shifting the main control to its second position, and means controlled by the rotatable timer for respectively supplying material to and discharging material from the processing chamber, at start and end respectively of the cycle of rotation of the timer.

6. In combination, a supply hopper, a processing chamber, means for processing material in the chamber, a timer, driving means for rotating the timer, means for energizing and deenergizing the driving means including a main control shiftable to a first or energizing position and a second or deenergizing position, biasing means tending to shift the control to its second position, means operable by material in the hopper in excess of predetermined minimum, tending to maintain the main control shifted to its first position against the action of said biasing means, means actuated by the rotatable timer for locking the main control in its first position except at the end of the cycle of rotation of the timer, shutoff means, means for shifting the shutoff means to operative or inoperative position, means actuated by the rotatable timer at the end of its cycle of rotation but only if the shutoff means has been shifted to operative position, for shifting the main control to its second position, and means controlled by the rotatable timer for respectively supplying material from the hopper to the processing chamber and discharging material from the processing chamber, at start and end respectively of the cycle of rotation of the timer.

7. In combination, a processing chamber, means for processing material in the chamber, a timer, driving means for rotating the timer, means for energizing and deenergizing the driving means including a main control shiftable to a first or energizing position and a second or deenergizing position, a solenoid, a switch in series with the solenoid, the solenoid when energized locking the main control in its first position, means actuated by the rotatable timer for closing the switch for the solenoid except at the end of the cycle of rotation of the timer, and means controlled by the rotatable timer for respectively supplying material to and discharging material from the processing chamber, at start and end respectively of the cycle of rotation of the timer.

8. In combination, a supply hopper, a processing chamber, means for processing material in the chamber, a timer, driving means for rotating the timer, means for energizing and deenergizing the driving means including a main control shiftable to a first or energizing position and a second or deenergizing position, biasing means tending to shift the control to its second position, means operable by material in the hopper in excess of predetermined minimum, tending to maintain the main control shifted to its first position against the action of said biasing means, a solenoid, a switch in series with the solenoid, the solenoid when energized locking the main control in its first position, means actuated by the rotatable timer for closing the switch for the solenoid except at the end of the cycle of rotation of the timer, and means controlled by the rotatable timer for respectively supplying material to and discharging material from the processing chamber, at start and end respectively of the cycle of rotation of the timer.

9. In combination, a processing chamber, means for processing material in the chamber, a timer, driving means for rotating the timer, means for energizing and deenergizing the driving means including a main control shiftable to a first or energizing position and a second or deenergizing position, a solenoid, a control switch and an auxiliary switch in series with the solenoid, the solenoid when energized shifting the main control to its second position, means actuated by the rotatable timer for opening the control switch for the solenoid except at the end of the cycle of rotation of the timer, and means controlled by the rotatable timer for respectively supplying material to and discharging material from the processing chamber, at start and end respectively of the cycle of rotation of the timer.

10. In combination, a processing chamber, means for processing material in the chamber, a timer, driving means for rotating the timer, means for energizing and deenergizing the driving means including a main control shiftable to a first or energizing position and a second or deenergizing position, first and second solenoids, a first control switch in series with the first solenoid, a second control switch and an auxiliary switch in series with the second solenoid, the first and second solenoids when energized, respectively locking the main control in its first position and shifting the main control to its second position, means actuated by the rotatable timer for closing the first control switch and opening the second control switch at beginning of the cycle of rotation of the timer, and then maintaining the first and second control switches closed and open respectively until the timer approaches the end of said cycle, and then opening the first control switch and closing the second control switch at end of said cycle, and means controlled by the rotatable timer for respectively supplying material to and discharging material from the processing chamber, at start and end respectively of the cycle of rotation of the timer.

11. In combination, a processing chamber, means for processing material in the chamber, a rotatable timer, a main electrical circuit, a main switch in the circuit, a first solenoid circuit and a master control circuit in parallel in the main circuit and in series with the main switch, an electrical power circuit, an electric motor for rotating the timer and a second solenoid circuit in parallel in the power circuit, a master control switch and a sustaining switch in parallel in the power circuit and in series with the electric motor and the second solenoid circuit, means for closing the master control switch responsive to energizing the master control circuit and for causing delayed opening of the master control switch responsive to deenergizing the master control circuit, a first solenoid and a first control switch in series in the first solenoid circuit, a second solenoid and a second control switch and an auxiliary switch in series in the second solenoid circuit, the first and second solenoids when energized, respectively locking the main switch in closed position and shifting the main switch to open position, means actuated by the rotatable timer for closing the sustaining switch and the first control switch and opening the second control switch at beginning of each cycle of rotation of the timer, and then maintaining the sustaining switch and the first control switch closed and the second control switch open until the timer approaches the end of each cycle of rotation, and then opening the sustaining switch and the first control switch and closing the second control switch at end of each cycle of rotation, the aforesaid means for causing delayed opening of the master control switch being operable during any cycle of rotation of the timer for delaying opening of the master control switch beyond closing of the sustaining switch at the beginning of the next cycle of rotation of the timer, and means controlled by the rotatable timer for respectively supplying material to and discharging material from the processing chamber, at start and end respectively of the cycle of rotation of the timer.

12. In combination, a supply hopper, a processing chamber, a rotatable timer, a main electrical circuit, a main switch in the circuit, biasing means tending to open the main switch, means operable by material in the supply hopper in excess of predetermined minimum, tending to maintain the main switch closed, means for heating the processing chamber, a first solenoid circuit and a master control circuit for the heating means in parallel in the main circuit and in series with the main switch, the master control circuit when energized and deenergized respectively causing and discontinuing operation of the heating means, an electrical power circuit, an electric motor for rotating the timer and a second solenoid circuit in parallel in the power circuit, a temperature-controlled switch and a sustaining switch in parallel in the power circuit and in series with the electric motor and the second solenoid circuit, the temperature-controlled switch respectively closing and opening, above and below predetermined temperature in the processing chamber, a first solenoid and a first control switch in series in the first solenoid circuit, a second solenoid and a second control switch and an auxiliary switch in series in the second solenoid circuit, the first and second solenoids when energized, respectively locking the main switch in closed position and shifting the main switch to open position, means actuated by the rotatable timer for closing the sustaining switch and the first control switch and opening the second control switch at beginning of the cycle of rotation of the timer, and then maintaining the sustaining switch and the first control switch closed and the second control switch open until the timer approaches the end of said cycle, and then opening the sustaining switch and the first control switch and closing the second control switch at end of said cycle, and means controlled by the rotatable timer for respectively supplying material to and discharging material from the processing chamber, at start and end respectively of the cycle of rotation of the timer.

RAYMOND H. VERMILLION.